United States Patent Office 3,379,691
Patented Apr. 23, 1968

3,379,691
POLYURETHANES CURED WITH THE REACTION PRODUCT OF 2-CHLOROANILINE; 2,5-DICHLOROANILINE; AND FORMALDEHYDE
Norman K. Sundholm, Middlebury, Conn., assignor to Uniroyal, Inc., a corporation of New Jersey
No Drawing. Filed Oct. 27, 1964, Ser. No. 406,878
1 Claim. (Cl. 260—75)

ABSTRACT OF THE DISCLOSURE

A composition having improved properties for curing polyurethane resins is made up of a mixture of 4,4'-methylenebis(2 - chloroaniline); 2,5,3' - trichloro-4,4' - diaminodiphenylmethane; and 4,4' - methylenebis(2,5-dichloroaniline). The mixture may be prepared by reacting 2-chloroaniline, 2,5-dichloroaniline and formaldehyde in certain ratios in the presence of an acid.

This invention relates to new chemical compositions which are curing agents for polyurethanes. More particularly the invention relates to condensation products of 2-chloroaniline and 2,5-dichloroaniline with formaldehyde, as well as to a method of making such condensation products, and to the use of such condensation products as curing agents for isocyanate-terminated polyurethanes.

In one important aspect, the invention relates to the curing of liquid polyurethanes containing isocyanate end groups. Such polyurethanes are usually prepared by reacting an excess of an organic diisocyanate with a long-chain glycol. Generally the glycols used are polyether glycols or polyester glycols. The molar ratio of diisocyanate to glycol should be greater than one and is preferably large enough so that the polyurethane is liquid. Such liquid polyurethanes are generally called prepolymers.

Curing agents for these prepolymers are compounds which contain more than one active hydrogen-containing group capable of adding to the isocyanate group. Glycols and diamines are such compounds. Water can also be used; it functions by reacting with an isocyanate group to form a primary amino group. The plurality of the addition reactions results in chain extension. The ratio of reactants is usually chosen so that an excess of isocyanate groups is present. These react with active hydrogen-containing groups in the polymer chain (e.g., urethane groups), to give branch points which result in cross-links. See pp. 273–4, Polyurethanes: Chemistry and Technology. I. Chemistry, by J. H. Saunders and K. C. Frisch, Interscience Publishers, 1962, for a description of the chemical reactions involved in the curing action.

Examples of curing agents (chain extenders) conventionally used are 4,4'-methylenebis(2-chloroaniline), 3,3' - dichlorobenzidine, 1,4 - butanediol, and hydroquinone bis(2-hydroxyethyl) ether. The diamines are preferred over the glycols since they react faster and thus have shorter cure times, and generally give better properties, such as higher tensile strength and higher hardness, after curing.

In commercial practice the diamine is usually mixed as a liquid with the prepolymer so as to have quick and facile mixing. If the diamine is a solid, it is melted before mixing. The diamine which is conventionally used to the greatest extent for this purpose is 4,4'-methylenebis(2-chloroaniline). Unfortunately, this diamine tends to solidify in the liquid polyurethane prepolymer before it is completely blended into the polymer, unless the polymer is preheated. Such premature solidification of the diamine will result in polymerdiamine mixes which cannot be cured or which on curing give stocks having inferior properties. The alternative is to heat the prepolymer to sufficiently high temperatures so that the 4,4'-methylenebis(2-chloroaniline) will remain liquid during the mixing; this procedure has two unsatisfactory aspects. One is that high temperatures have deleterious effects on the properties of the prepolymer. Its isocyanate content decreases and its viscosity increases, when it is heated above about 70° C. This is due, at least partially, to the reaction of the isocyanate groups with urethane groups to form allophanate groups; this results in the formation of cross-links. The other aspect is the shortening of the pot life, the elapsed time from the addition of the curative until the mixture becomes unpourable. If the pot life is too short, there is not sufficient time for the mixing and pouring operations.

Another curative, 4,4'-methylenebis(2,5-dichloroaniline), has been found to have a longer pot life than 4,4'-methylenebis(2-chloroaniline) but unfortunately the melting point of such tetrachloro compound is too high, 164–165° C., for such compound to be generally applicable.

Accordingly, an important object of the invention is to provide new compositions as curing agents for the liquid polyurethanes which have pot lives longer than that provided by 4,4'-methylenebis(2-chloroaniline), melting points below about 130° C., and solidification points lower than that of 4,4'-methylenebis(2-chloroaniline).

The present invention is based on the surprising discovery that certain mixtures of 2-chloroaniline and 2,5-dichloroaniline can be reacted with formaldehyde to provide new and useful compositions which are effective curing agents or polyurethanes. The new curative compositions display unexpected and valuable properties, in comparison to heretofore available diamine curatives. The most important property is that they have pot lives longer than that of 4,4'-methylenebis(2-chloroaniline), some of them having pot lives 3½ times that of this conventional diamine curative. Another important property is the ability to supercool, that is, when a new curative composition of the invention is heated to a temperature at which it is liquid, it can thereafter be cooled down to a temperature much lower than the temperature at which it was melted, without tending to resolidify readily. The importance of this is that the aforementioned difficulty experienced with the conventional curatives, namely, premature solidification of the molten diamine in the polymer mix unless the polymer is excessively preheated, is not encountered since the new curatives of the invention do not resolidify readily, but instead supercool remarkably.

An outstanding advantage of the new curative compositions of the invention is that their low solidification points permit processing at reduced temperatures, with resultant longer pot life. Another advantage of the present molten curatives which solidify at low temperatures is that there is less likelihood that the curative will solidify in and plug up the lines carrying it to the mixer. Less elaborate, if any, precautions are necessary to insure its remaining liquid. The curative compositions of the invention are the mixtures of diamines obtained by condensing formaldehyde with certain mixtures of 2-chloroaniline and 2,5-dichloroaniline in the presence of an acid. The compositions are evidently mixtures to a large degree of 4,4'-methylenebis(2-chloroaniline) (I), 2,5,3'-trichloro-4,4'-diaminodiphenylmethane (II), and 4,4'-methylenebis(2,5-dichloroaniline) (III):

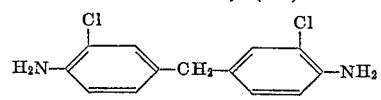

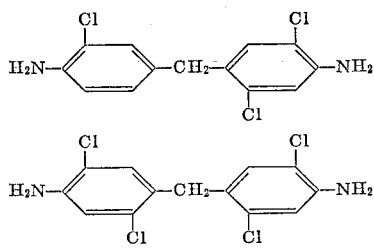

Experimentation has shown that the novel compositions having improved pot life and melting below about 130° C. are those prepared from mixtures of 2-chloroaniline and 2,5-dichloraniline in which the molar ratio of monochloraniline to dichloroaniline, respectively, is in the range 9:1 to 1:2. Condensation products produced from mixtures richer in monochloroaniline have pot lives equivalent to that of 4,4'-methylenebis(2-chloroaniline). Products from mixtures richer in the dichloroaniline melt above about 130° C.

The amount of formaldehyde used should be such that the molar ratio of the total amines to the formaldehyde is at least about 2:1, that is, about 2:1 or higher (e.g., 4:1, 5:1, 10:1, or more). Unreacted amines are removed from the condensation products by vacuum or steam distillation.

The condensations are carried out in inert solvents. The lower alcohols, such as methanol, ethanol, the propanols, and the butanols, are preferred; but water, ethers, lower aliphatic acids, aromatic hydrocarbons, etc., are also suitable.

The condensation is promoted by acids; it is preferred to use one of the strong mineral acids such as hydrochloric or sulfuric, but other inorganic or organic acids may be used such as phosphoric, p-toluene-sulfonic, oxalic, dichloroacetic, and trichloroacetic. The amount of acid used is not critical; it is not necessary to use one equivalent of acid per mole of total amines. For example, when hydrochloric acid is used with ethanol as the solvent, 0.38, 0.5, 1.5, and 3 equivalents of acid per mole of total amines give high yields of products having similar, maximum properties; when 0.25 equivalent is used, a product of lower quality is obtained in reduced yield. When 1 equivalent of sulfuric acid is used, good results are obtained. When hydrochloric acid is used with water as the solvent, 1, 2, and 3 equivalents of acid per mole of total amines give high yields of products having good properties. The useful amounts of acid are usually within the range from 0.25 to 3 equivalents of acid per mole of total amines, but 0.1 to 10 equivalents may be used.

The condensations are best carried out at moderately increased temperatures; the preferred temperature range is 50–100° C., although lower and higher temperatures may be used (e.g., 20–150° C.).

Example I

The preparation of one of the products of this invention, in which the molar ratio of 2-chloroaniline: 2,5-dichloroaniline:formaldehyde is 3:1:1, respectively, is given as an example:

To a stirred solution of 76.5 grams (0.6 mole) of 2-chloroaniline and 32.4 grams (0.2 mole) of 2,5-dichloroaniline in 500 ml. of ethanol was aded 66.7 ml. (0.8 mole) of concentrated hydrochloric acid. The stirred mixture was heated to 70° C. and 16.2 grams (0.2 mole) of 37% formaldehyde added dropwise during one hour. After completion of the addition, the mixture was heated at 70° C. for two hours, and then ethanol distilled until the residue was a paste. About 800 ml. of warm water and 60 ml. of 28–30% aqueous ammonia were added. The organic layer was subjected to steam distillation to remove excess monochloro- and dichloroanilines. The residual oily layer solidified on cooling; it was collected by filtration, washed with water, and dried. It weighed 58 grams and melted at 105–110° C. It analyzed for 31.1% chlorine.

Some of the products of this invention have been examined by gas-liquid chromatography, which shows the presence of three major components. The component having the shortest retention time has the same retention time as 4,4'-methylenebis(2-chloroaniline) (I); the component having the longest retention time has the same retention time as 4,4'-methylenebis(2,5-dichloroaniline) (III). The component having the intermediate retention time is the new compound, 2,5,3'-trichloro-4,4'-diaminodiphenylmethane (II), formed by the condensation of one molecule of formaldehyde with one molecule each of 2-chloroaniline and 2,5-dichloroaniline.

This was proven by its isolation and characterization. Using the procedure given above for the preparation of one of the products of this invention, 1 mole of formaldehyde was reacted with a mixture of 1 mole of 2-chloroaniline and 3 moles of 2,5-dichloroaniline in the presence of 4 moles of hydrochloric acid. By gas-liquid chromatography the product was shown to contain about 4% of 4,4'-methylenebis(2-chloroaniline), about 30% of the new compound, and about 66% of 4,4'-methylenebis(2,5-dichloroaniline). Experimentation has shown that 4,4'-methylenebis(2-chloroaniline) is soluble and 4,4'-methylenebis(2,5-dichloroaniline) is almost insoluble in 20% dichloroacetic acid. This is evidently due to the greater effect of two chlorine atoms substituted on the same benzene ring over one chlorine atom in reducing the basicity of the amino group on that ring. Since the new compound contains one amino group on a benzene ring substituted with but one chlorine atom, it would be expected to be soluble in 20% dichloroacetic acid. Accordingly, to effect separation of the new compound and the small amount of the dichloro compound from the tetrachloro compound, 100 grams of the product was dissolved in 2250 ml. of benzene and the solution repeatedly extracted with 250-ml. portions of 20% dichloroacetic acid. The extracts were made alkaline with aqueous ammonia and the precipitates collected by filtration. The dried solid was recrystallized from 80% ethanol to afford 3.5 grams of colorless crystals melting at 143–144° C. In gas-liquid chromatography it has the same retention time as the component in the condensation products having the intermediate retention time. Elemental analysis and the infrared spectrum are consistent with the trichloro compound.

*Analysis.*—Calculated for $C_{13}H_{11}Cl_3N_2$: C, 51.74; H, 3.65; Cl, 35.32; N, 9.29. Found: C, 51.58; H, 3.73; Cl, 35.17; N, 8.99.

It is believed that it is due to the presence of this trichloro compound that these products have such good properties, i.e., low melting point, high degree of supercooling, and long pot life. For example, the properties of the product obtained by condensing 2-chloroaniline, 2,5-dichloroaniline, and formaldehyde in the molar ratio 2:2:1 have been compared with the properties of the equimolar mixture of 4,4'-methylenebis-(2-chloroaniline) and 4,4'-methylenebis(2,5-dichloroaniline). The product of this invention melts at 110–114° C., supercools to 61° C. before solidifying, and has a pot life in a commercial prepolymer at 100° C. of 42 minutes; the equimolar mixture of the two diamines melts at 124–136° C., supercools to only 97° C., and has a pot life of 29 minutes in the same prepolymer.

All of the condensation products of this invention tested supercool to temperatures at or below 70° C. before solidifying. Commercial samples of 4,4'-methylenebis(2-chloroaniline) melt in the range 99–109° C. and resolidify in the range 85–99° C.

Example II

This example illustrates the manner of use of the mixed condensation products of the invention as curatives for a liquid polyurethane prepolymer.

A suitable conventional prepolymer may be made from a hydroxy-terminated polyethylene adipate polyester, molecular weight 1220, acid value less than 1, water content not more than 0.1%. To 1000 grams of such polyester may be added with stirring 270 grams of 2,4-toluene diisocyanate. The mixture may be heated until the equivalent weight of the liquid, isocyanate-terminated prepolymer formed is about 1300 (that is, equivalent weight with respect to reactivity with amine, also called the "amine equivalent," which may be determined by the method referred to at page 29 of the Saunders and Frisch reference cited above).

A series of curatives of the invention may be prepared, using the procedure of Example I, and employing, as shown in Table I, various molar ratios of 2-chloroaniline to 2,5-dichloroaniline (M:D) and various molar ratios of total amines to formaldehyde (M+D:H₂CO). Table I also shows the melting range, chlorine analysis, and pot life of the various curatives.

To evaluate the curatives, they were weighed out in quanities to provide 0.9 equivalent of amine per isocyanate equivalent using 150 grams of polymer. The equivalent weights of the curatives were calculated from their chlorine analysis using the expression.

$$99\left(1+\frac{P}{102.9-P}\right)$$

in which P is the present chlorine. The curatives which melt below 125° C. were heated to that temperature; those which melt higher were melted and cooled to 125° C. The polymer heated to 125° C. was added. After blending and centrifuging for 1½ minutes, 80 grams of the polymer-curative blend was poured into a mold 7 x 7 x 0.075 inches and press-cured at 100° C. for 1 hour. The cured sheets were removed and post-cured for 16 hours at 100° C. The remainder of the blend was kept in an oven at 100° C. and the elapsed time from mixing until the blend became unpourable observed; this is the pot life. Physical properties of the cured sheets were determined, as shown in Table I.

ample the product from the molar ratio 4:4:3 has a pot life 3¼ times that of 4,4'-methylenebis(2-chloroaniline) and solidifies at least 30 degrees lower.

It will be understood that the invention is applicable to the curing of conventional polyurethane prepolymers in general. As is well known to those skilled in this art such materials are produced from an organic compound rich in hydroxy groups, usually a polymer having at least two terminal hydroxy groups, frequently a polyether or polyester, and an organic polyisocyanate, usually a diisocyanate. The polymer used for reaction with the polyisocyanate to make the polyurethane is frequently a polyether or polyester glycol having a molecular weight of from 400 to 6000, preferably in the 1000–2000 range. Mention may be made of chain extended polyesters made from a glycol (e.g., ethylene and/or propylene glycol) and a saturated dicarboxylic acid (e.g., adipic acid). Usually the starting glycol contains from 2 to 20 carbon atoms and the acid contains from 4 to 12 carbon atoms. Polyethylene adipate, polyethylene adipate-phthalate, polyneopentyl sebacate, etc. may be mentioned. Small amounts of tri-alcohols such as trimethylolpropane or trimethylolethane may be included. There may also be mentioned the polyethers, such as polypropylene glycol, polypropylene-ethylene glycol and polytetramethylene glycol. Among the suitable polyisocyanates may be mentioned m- and p-phenylene diisocyanates; toluene diisocyanate; p,p'-diphenylmethane diisocyanate; 3,3'-dimethyl (or dimethoxy)-4,4'-biphenyl diisocyanate; 1,5-naphthylene diisocyanate; p,p',p" - triphenylmethane trisocyanate; p-phenylene diisothiocyanate, etc. The isocyanate is of course used in amount at least equivalent to the hydroxyl groups in the starting polymer; larger quantities of diisocyanate favor formation of liquid prepolymer. Generally the molar ratio of diisocyanate to glycol is in the 1.2:1 to 3:1 range. For additional examples of suitable starting materials for making polyurethanes, reference may be had to the following: Otto Bayer in "Angewandte Chemie," A/59 (1947), No. 9, page 264; U.S. Patent 3,105,062. Graham and Gregg, Sept. 24, 1963. It will be

TABLE I

| Molar[1] ratio M:D | Molar ratio M+D:H₂CO | Melting range, °C. | Chlorine analysis, percent | Pot life at 100° C., min. | Tensile strength, p.s.i. | Elongation, percent | 300% Modulus, p.s.i. | Hardness, Shore A |
|---|---|---|---|---|---|---|---|---|
| 9:1 | 4:1 | 86–91 | 28.8 | 13 | 5,915 | 435 | 1,130 | 71 |
| 4:1 | 4:1 | 87–96 | 28.3 | 15 | 4,700 | 535 | 1,310 | 76 |
| 3:1 | 4:1 | 105–110 | 31.1 | 18 | 5,400 | 450 | 985 | 67 |
| 3:1 | 2:1 | 82–112 | 33.0 | 21 | 6,000 | 430 | 1,095 | 68 |
| 3:2 | 4:1 | 110–115 | 33.6 | 25 | 6,140 | 430 | 900 | 71 |
| 3:2 | 8:3.5 | 100–118 | 33.0 | 26 | 6,050 | 445 | 1,160 | 73 |
| 3:2 | 2:1 | 90–117 | 33.7 | 28 | 6,650 | 420 | 1,045 | 68 |
| 1:1 | 4:1 | 110–114 | 35.1 | 42 | 5,330 | 495 | 700 | 66 |
| 1:1 | 8:3 | 101–115 | 35.1 | 39 | 7,520 | 445 | 870 | 72 |
| 2:3 | 4:1 | 115–120 | 36.9 | 43 | [2] 6,510 | 430 | 1,170 | 76 |
| 2:3 | 8:3 | 99–129 | 37.1 | 43 | 6,900 | 425 | 815 | 75 |
| 2:3 | 2:1 | 45–55 | 35.4 | 42 | 6,060 | 410 | 1,275 | 74 |
| 1:2 | 2:1 | 95–127 | 37.4 | 42 | 6,050 | 425 | 1,190 | 71 |

[1] Ethanol was used as the reaction solvent; the reaction temperature was about 70° C. One equivalent of hydrochloric acid was used per mole of the total amount of amines used.
[2] Press-cured for 1½ hours.

The physical properties of the stock cured with 4,4'-methylenebis(2-chloroaniline) are: tensile strength of 5425 p.s.i., elongation of 455%, 300% modulus of 830 p.s.i., and Shore A hardness of 75. It has a pot life of 12 minutes.

The data show that the pot lives of the products increase as the molar ratio of 2-chloroaniline to 2,5-dichloroaniline is decreased, and that they reach a plateau when the ratio becomes about 1:1. Gas-liquid chromatographic analysis of the product using the molar ratio of total amines to formaldehyde of 4:1 shows that at this point the sum of the percentages of the trichlorodiamine (II) and the tetrachlorodiamine (III) in the product is about 80%, the remainder being the dichlorodiamine (I).

By the application of the principles of this invention a curative can be prepared which has a pot life 3½ times that of 4,4'-methylenebis(2-chloroaniline) and solidifies at least 24 degrees lower; this is the product from the condensation of 2-chloroaniline, 2,5-dichloroaniline, and formaldehyde in the molar ratio 2:2:1. As another exunderstood that the present curative compositions may be used in the same proportions and under the same curing conditions as conventional diamine curatives. Almost invariably the proportions of diamine curative to prepolymer are such as to provide from about 0.5 to about 1.1 equivalents of amine per isocyanate equivalent in the prepolymer. The curative in the molten state is blended with the liquid prepolymer and is then shaped, for example, cast, molded, spread on cloth or otherwise used to coat and/or impregnate. While in the desired shape the mixture is heated to expedite cure, for example, to a temperature of 50–250° C. for ½–48 hours (time and temperature of cure being generally inversely related) depending on such factors as the particular prepolymer used, the amount of curative, the degree of cure desired, the size of the article, the character of the heating device, etc. It will be understood that the curing conditions are not critical, but simply follow conventional practice.

It will also be understood that the invention contemplates the use, as a curative for the polyurethane, of either the new chemical 2,5,3'-trichloro-4,4'-diaminodiphenylmethane (II) itself, or mixtures containing a substantial quantity of (II), as described.

Having thus described my invention, what I claim and desire to protect by Letters Patent is:

1. The composition obtained by:
   (A) mixing (i) the products of acid-catalyzed condensation at a reaction temperature between 20° C. and 150° C. of 2-chloroaniline, 2,5-dichloroaniline, and formaldehyde in which the molar ratio of 2-chloroaniline to 2,5-dichloroaniline is in the range of 9:1 to 1:2 and the molar ratio of 2-chloroaniline and 2,5-dichloroaniline to formaldehyde is at least 2 to 1 with (ii) a liquid isocyanate terminated polyurethane prepolymer, using proportions of said products (i) to said prepolymer to provide from about 0.5 to 1.1 equivalents of amine per isocyanate equivalent and,
   (B) heating the mixture at a temperature of 50–250° C.

References Cited

UNITED STATES PATENTS

| | | | |
|---|---|---|---|
| 471,659 | 3/1892 | Vongerichten | 260—570 |
| 3,036,996 | 5/1962 | Kogon | 260—77.5 |
| 3,188,302 | 6/1965 | Lorenz | 260—77.5 |
| 3,194,793 | 7/1965 | Kogon | 260—77.5 |
| 3,253,031 | 5/1966 | Powers | 260—570 |
| 3,297,758 | 1/1967 | Hoeschele | 260—570 |

FOREIGN PATENTS 1,131,398  6/1962  Germany.

OTHER REFERENCES

Rubber Age, volume 89.
Bulletin of the United States Rubber Company.

DONALD E. CZAJA, *Primary Examiner.*

F. McKELVEY, *Assistant Examiner.*